April 9, 1957  J. M. HOLLYWOOD  2,788,489
PHASE DETECTING SYSTEM
Filed June 10, 1952
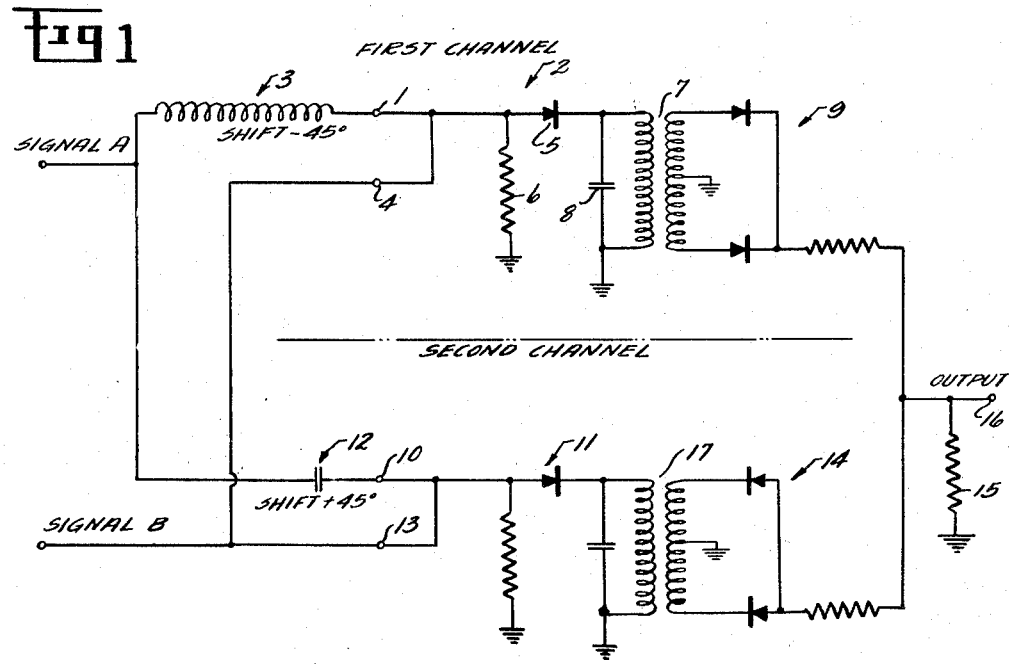
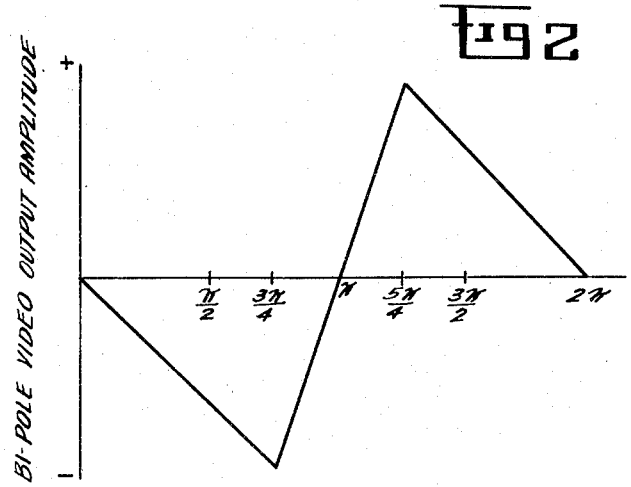
INVENTOR.
JOHN M. HOLLYWOOD
BY

United States Patent Office 2,788,489
Patented Apr. 9, 1957

2,788,489
PHASE DETECTING SYSTEM

John M. Hollywood, Forest Hills, N. Y., assignor to the United States of America as represented by the Secretary of the Air Force Application June 10, 1952, Serial No. 292,755

4 Claims. (Cl. 324—83)

This invention relates to phase detecting systems and more particularly to the type of phase detector which will produce an output which is a function of the phase difference between the two input signals and whose output is independent of the relative amplitude of the two input signals.

In the art of radar systems employing moving target indicator receivers it is essential that the phase detector output be independent of the amplitude of the signals being compared. The phase detectors previously used in moving target indicator receivers have been of the double-diode type and fairly elaborate circuits were used in the input of the double-diode detector to insure that the detector output would be independent of signal amplitude.

It is an object of this invention to provide a phase detector for use in moving target indicator receivers which will be simple in construction while still insuring that the detector output is independent of relative amplitudes of the input signals.

The above object, as well as other objects, features and advantages of this invention will be more clearly understood in view of the following description when taken in conjunction with the drawing wherein:

Fig. 1 is a schematic diagram of a circuit embodying this invention.

Fig. 2 is a graph illustrating the characteristics of the phase detector illustrated in Fig. 1.

Referring now to Fig. 1, the signal A is fed to the input terminal 1 of the mixer 2 through a phase shifter 3. Signal B is fed to the input terminal 4 of the mixer 2. The mixer 2 preferably consists of a crystal rectifier 5 and resistor 6. The output of the mixer 2 is fed to an A. C. coupling network which may consist of a transformer 7 having its primary by-passed by a capacitor 8. The output of the coupling network is fed to a full wave rectifier 9. The above described circuit constitutes a first channel of a phase detector embodying this invention.

Signal A and signal B are also fed to a similar channel to the one above described. The signal A being fed to input terminal 10 of mixer 11 through a phase shifter 12 and the signal B being fed to an input terminal 13 of the mixer 11. The remainder of the second channel is identical to the first channel except that the full wave rectifier 14 is poled oppositely from the full wave rectifier 9 of the first channel. The outputs of the first and second channels are combined in resistor 15 and the output terminal 16 is connected to the high side of the resistor 15.

The phase shifter 3 shifts the phase of signal A by a negative 45° and this shifted signal is mixed with signal B in the mixer 2. The output of the mixer which consists of a series of pulses whose wave shape will be determined by the characteristics of the mixer 2 is coupled to a full wave rectifier 9 by a coupling transformer 7. A capacitor 8 is connected in shunt with the primary winding to provide a by-pass for frequencies of the order of the frequency of the signals A and B so that the frequency in the secondary winding is determined by the phase relation of signals A and B.

The second channel functions in the manner described above with relation to the first channel. Although it will be apparent that the signal in the secondary of transformer 7 and the signal in the secondary of transformer 17 will have their amplitudes dependent upon the amplitudes of signals A and B, the relative amplitudes of signals A and B will not have any influence on the magnitude of the output 16 due to the opposite polarities of rectifiers 9 and 14.

Although in the above described embodiment of this invention a shift of negative 45° of signal A to the input terminal 1 and a positive shift of 45° of signal A to the input terminal 10 was described, it will be apparent that it is only essential that a 90° phase difference be made, that is, signals A and B could as well have been fed directly to terminals 1 and 4 of the first channel while signal A was shifted 90° and then applied to terminal 10 and signal B fed directly to terminal 13 of a second channel.

What is claimed is:

1. Apparatus for producing a voltage which is a function of the phase difference between two signals comprising a first and second rectifier type mixer, a first and second signal circuit, circuit means for impressing a signal from said first signal circuit on the input of said first and second mixers, said circuit means including phase shifter means operable to produce a 90° phase difference of potential between said first and second mixer, circuit means impressing a signal from said second signal circuit on the input of said first and second mixers, a first output circuit for said first mixer, a first coupling transformer in said first output circuit, a first rectifier connected to said first coupling transformer, a second output circuit for said second mixer, a second coupling transformer in said second output circuit, a second rectifier connected to said second coupling transformer, and circuit means to combine the output of said first rectifier and said second rectifier.

2. Apparatus for producing a voltage which is a function of the phase difference between two signals comprising a first and second rectifier type mixer, a first and second signal circuit, circuit means for impressing a signal from said first signal circuit on the input of said first and second mixers, said circuit means including phase shifter means operable to produce a 90 degree phase difference of potential between said first and second mixer, circuit means impressing a signal from said second signal circuit on the input of said first and second mixers, a first output circuit for said first mixer, a first coupling transformer in said first output circuit, a first rectifier connected to said first coupling transformer, said first rectifier having a predetermined polarity, a second output circuit for said second mixer, a second coupling transformer in said second output circuit, a second rectifier connected to said second coupling transformer, said second rectifier having a polarity opposite to said first rectifier, and circuit means to combine the output of said first rectifier and said second rectifier.

3. Apparatus for producing a voltage which is a function of the phase difference between two signals comprising a first and second rectifier type mixer, a first and second signal circuit, circuit means for impressing a signal from said first signal circuit on the input of said first and second mixers, said circuit means including phase shifter means operable to produce a 90 degree phase difference of potential between said first and second mixer, circuit means impressing a signal from said second signal circuit on the input of said first and second mixers, a first output circuit for said first mixer, a first coupling transformer in said first output circuit, a first rectifier connected to said first coupling transformer, said first rectifier having a predetermined polarity, a second output circuit for said second mixer, a second coupling transformer in said second output circuit, a second rectifier connected to said second coupling transformer, said second rectifier having a polarity opposite to said first rectifier, and circuit means to combine the output of said first rectifier and said second rectifier, a first by-pass capacitor connected in shunt with said first transformer, a second by-pass capacitor connected in shunt with said second transformer.

4. A moving target indicator phase detector comprising first and second signal circuits, first and second rectifier type mixers, circuit means operative to impress on each of said mixers a potential in phase with the signal current in said first signal circuit, circuit means operative to impress on said first mixer a potential lagging the signal current in said second signal circuit, circuit means operative to impress on said second mixer a potential leading the signal current in said second signal circuit, said leading and lagging potentials being displaced 90° in phase relation, a first and second rectifier, first and second coupling transformers coupling the first and second mixers to the respective rectifiers, a by-pass capacitor in shunt relation with each of said transformers, said first and second rectifiers being of opposite polarity, a common output circuit for said rectifiers.

References Cited in the file of this patent

UNITED STATES PATENTS

| | | |
|---|---|---|
| 2,405,073 | Troell | July 30, 1946 |
| 2,429,216 | Bollman | Oct. 21, 1947 |
| 2,467,361 | Blewett | Apr. 12, 1949 |
| 2,548,779 | Emslie | Apr. 10, 1951 |
| 2,562,329 | O'Brien | July 31, 1951 |
| 2,608,683 | Blewett | Aug. 26, 1952 |